United States Patent [19]

Blom

[11] Patent Number: 4,540,906
[45] Date of Patent: Sep. 10, 1985

[54] STATOR ASSEMBLY FOR PERMANENT MAGNET ROTARY DEVICE

[75] Inventor: Hans A. Blom, Portland, Oreg.

[73] Assignee: Synektron Corporation, Portland, Oreg.

[21] Appl. No.: 588,138

[22] Filed: Mar. 9, 1984

[51] Int. Cl.³ .............................................. H02K 5/00
[52] U.S. Cl. .................................. 310/67 R; 29/596; 310/42; 310/68 B; 310/268
[58] Field of Search .............. 310/42, 43, 67 R, 68 B, 310/71, 91, 168, 171, 194, 239, 259, 266, 268, 89, 235, 68 R, 90; 324/173, 174; 29/596

[56] References Cited

U.S. PATENT DOCUMENTS

| | | | |
|---|---|---|---|
| 3,662,196 | 5/1972 | Ruschmann | 310/68 B |
| 4,259,603 | 3/1981 | Uchiyama et al. | 310/68 B |
| 4,311,933 | 1/1982 | Riggs et al. | 310/67 R |
| 4,361,776 | 11/1982 | Hayashi et al. | 310/268 |

Primary Examiner—Peter S. Wong
Assistant Examiner—D. L. Rebsch
Attorney, Agent, or Firm—Chernoff, Vilhauer, McClung, Birdwell & Stenzel

[57] ABSTRACT

A stator assembly for a brushless DC permanent magnet motor or generator features an internal stator with electrical windings surrounded by a permanent magnet rotor. The stator assembly includes a collar member matingly interconnecting the stator core and the winding's power supply circuit board so as to automatically position them, during manufacture of the device, in predetermined angular and axial relationships with respect to each other, and in predetermined axial relationships with respect to the rotor. The collar member also contains an axial passageway which facilitates handling of the stator assembly during manufacture.

13 Claims, 4 Drawing Figures

STATOR ASSEMBLY FOR PERMANENT MAGNET ROTARY DEVICE

BACKGROUND OF THE INVENTION

The present invention is directed to improvements in stator assemblies for brushless DC permanent magnet motors and generators of the type wherein the stator is located internally of a permanent magnet rotor.

Inexpensive, high-production manufacture of the foregoing type of rotary permanent magnet devices has been hampered in the past by difficulties in constructing the stator assembly of the device. Such stator assemblies normally are composed of an annular, magnetically-permeable core upon which an electrically-conductive winding is mounted, with a circuit board spaced axially from the core and winding which feeds electrical power to the winding. The circuit board also mounts Hall effect sensors, which detect the rotational attitude of the rotor's permanent magnets by sensing their magnetic fields and cause commutation of the electrical current to the winding in response to the magnets' positions by means of well-known electronic circuits designed for this purpose.

At present, relatively high manufacturing costs are incurred in the process of precisely and rigidly orienting the core and its associated winding both angularly and axially with respect to the circuit board. Such orientation is critical to enable high-speed automated soldering of the winding leads to the circuit board while avoiding improper wire position and preventing wire fatigue and resultant breaking during manufacture, and also to orient the winding angularly with respect to the Hall effect sensors.

Precise axial orientation of the rotor with respect to the circuit board is also critical, so that the Hall effect sensors on the circuit board are positioned in correct axial proximity to the permanent magnets of the rotor for proper detection of the magnetic fields.

Currently it is a common practice to utilize multiple screws or spacers to interconnect the core and circuit board, after the winding has been mounted on the core, to provide the above-mentioned angular and axial orientation between the core and circuit board. However, the installation of the screws or spacers is time-consuming and expensive, and can also cause damage to the winding if not very carefully performed.

Alternatively it has been known to utilize specially constructed winding bobbins capable of providing the above-mentioned angular and axial orientation functions, as exemplified by U.S. Pat. No. 4,259,603. However, such bobbins provide the orientation features only as an integral part of the structure for mounting the winding, resulting in an extremely complicated stator assembly. Such an arrangement does not permit addition of the orientation features to the core after the winding has been mounted thereon, which would facilitate the process of mounting the winding on the core, as well as simplifying the stator structure.

Accordingly, what is needed is a stator assembly for this type of electrical device which automatically and inexpensively performs all of the foregoing angular and axial orientation functions by means of a member connectable to the core after the winding has been mounted thereon, without the need for precise and time-consuming manipulations.

SUMMARY OF THE PRESENT INVENTION

The present invention satisfies the foregoing need by providing a stator assembly which features a unique collar member which matingly connects with the core, after the mounting of the winding thereon, to interconnect the core and circuit board in such a way that the two elements are automatically oriented precisely both angularly and axially with respect to each other. The collar member also provides means for automatically precisely orienting both the core and circuit board axially with respect to the rotor so that the magnets of the rotor have the proper axial proximity to the Hall effect sensors mounted on the circuit board, and are axially aligned with the winding. In addition, the collar provides a convenient means by which the entire stator assembly may be engaged and handled from above during the various stages of its manufacture.

The collar member connects detachably to the core by fitting axially through a mating aperture in the core after the winding has been mounted on the core. Angular orientation between the circuit board and core is obtained principally by a mating interlocking key and keyway formed in the collar and core aperture, respectively. The circuit board may either be permanently connected to the collar, or may likewise be detachably connected and properly angularly oriented with respect thereto by means of another interlocking key and keyway.

Precise axial spacing of the core and its related winding with respect to the circuit board is obtained by a shoulder structure formed on the external surface of the collar member which limits the axial insertion of the collar through the core's aperture. If the circuit board is detachably connected to the collar, a flange is provided on the collar at a predetermined axial distance from the shoulder structure to position the circuit board axially on the collar, such that the combination of the shoulder and flange provide the necessary axial spacing.

Axial orientation of the core and circuit board with respect to the rotor is provided by a second shoulder structure formed on the wall of an interior passageway extending axially through the collar. This shoulder structure establishes the axial relationship between the stator assembly and the rotor, thus enabling the collar to precisely establish the relative axial position of the magnets in the rotor, with respect to the core, and the Hall effect sensors on the circuit board.

The internal axial passageway in the collar further permits insertion of an expandable plug or similar mechanical device to facilitate engagement and handling of the stator assembly from above during its various manufacturing steps, especially during automated soldering of the winding leads to the underside of the circuit board.

Accordingly, it is a principal objective of the present invention to provide a stator assembly structure featuring a core and its associated winding matingly interconnected with a circuit board for transmitting current to the winding by means of a member which automatically orients the core and circuit board both angularly and axially with respect to each other, and which is connectable to the core after the winding has been mounted thereon.

The foregoing and other objectives, features, and advantages of the invention will be more readily understood upon consideration of the following detailed description of the invention, taken in conjunction with the accompanying drawings.

DESCRIPTION OF THE PREFERRED EMBODIMENT

Figure 1:
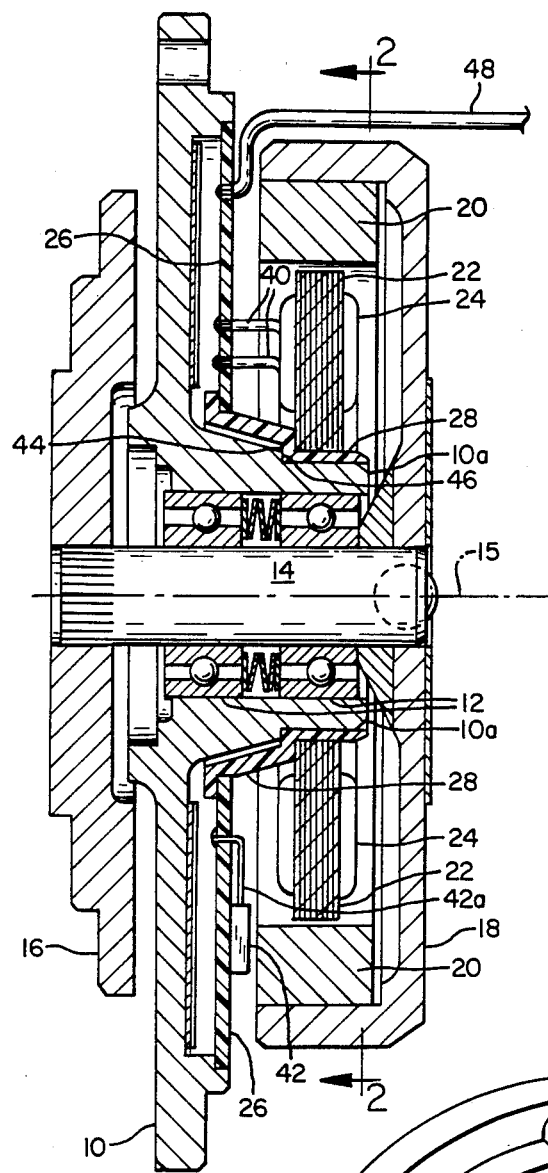
FIG. 1 is a cross-sectional side view of an exemplary embodiment of a permanent magnet motor constructed in accordance with the present invention.

The permanent magnet motor shown in FIG. 1 is of a type specially designed for computer disk drive applications, it being understood that the invention is applicable as well to other configurations of external-rotor permanent magnet devices. The motor of FIG. 1 comprises a rotor mount 10, adapted for mounting to some convenient supporting structure (not shown), and having a hub portion 10a containing a pair of bearings 12 which rotatably journal a drive shaft 14 for rotation about an axis of rotation 15. Fixedly attached to one end of the drive shaft 14 is a disk drive spindle 16 which is rotatably driven through shaft 14 by a rotor 18 likewise fixedly attached to the shaft 14. The rotor 18 is in the shape of a flat cup and has permanent magnets 20 distributed around the inside surface of its periphery, such magnets being radially magnetized. Mounted on the hub 10a of the rotor mount 10, and surrounded by the rotor 18, is a stator assembly composed of a magnetically-permeable, generally annular core 22 having an electrically-conductive winding 24, a circuit board 26 for supplying electrical power to the winding 24, and a collar member 28 rigidly interconnecting the core 22 and circuit board 26.

The collar member 28 is of an annular, generally frusto-conical shape having an inner wall defining an internal passageway 30 extending axially through the collar member. Although the circuit board 26 could conceivably be an integral part of the collar member 28, it is preferable that the circuit board 26 be a separate piece which is detachably connectable to the base of the collar member. The various angular and axial orientation features of the collar member 28 will now be described with relation to the procedure for manufacturing the motor of FIG. 1.

Prior to the assembly of the various components of the stator structure, the winding 24 is mounted on the core 22. During mounting of the winding on the core, it is preferable that the collar 28 and circuit board 26 be separate from the core so as not to interfere with the winding process. After the winding has been mounted on the core, the circuit board and collar member are interconnected with the core and winding assembly by first mounting the circuit board 26 on the base of the collar member 28 by sliding the periphery of the circuit board's central circular aperture 26a (FIG. 2) into mating abutment with the collar member's annular base flange 32. The periphery of the aperture 26a in the circuit board has a keyway (not shown) which mates with a key 34 on the collar member adjacent the flange 32 so as to angularly orient the circuit board 26 with respect to the collar member 28. If desired, the circuit board 26 can be fastened by any suitable adhesive or ultrasonic heat staking to the flange 32, although a close-tolerance fit may make such adhesion or staking unnecessary.

Figure 2:
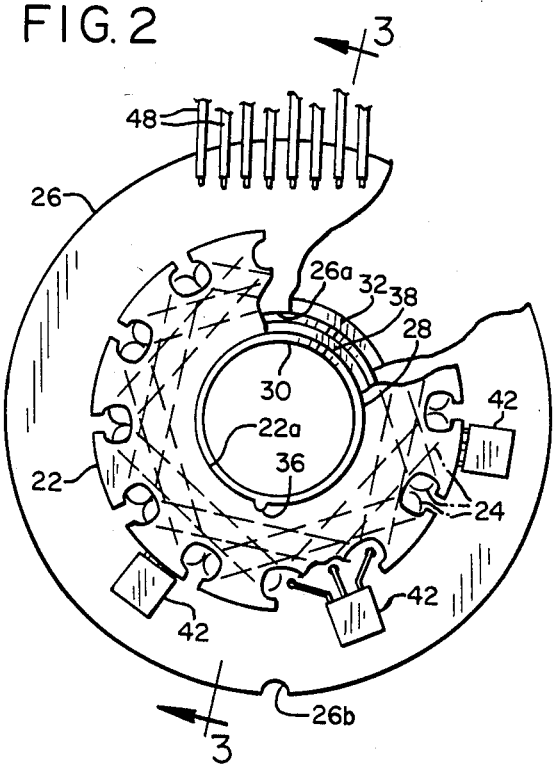
FIG. 2 is a view taken along line 2—2 of FIG. 1, with the permanent magnet rotor removed and other parts broken away to reveal underlying structure.
Figure 3:
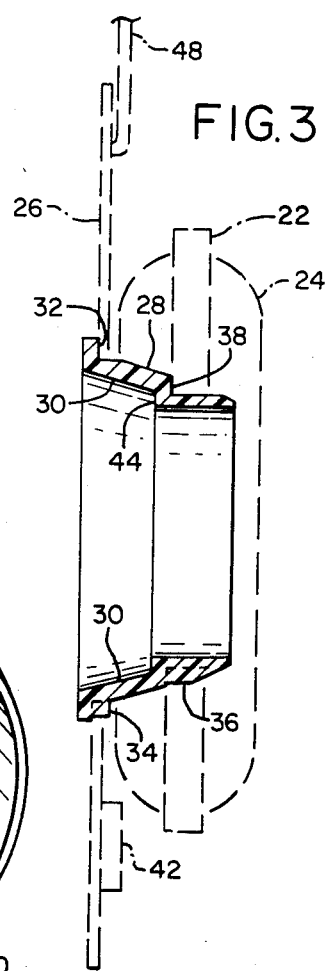
FIG. 3 is a sectional view of the collar member taken along 3—3 of FIG. 2.
Figure 4:
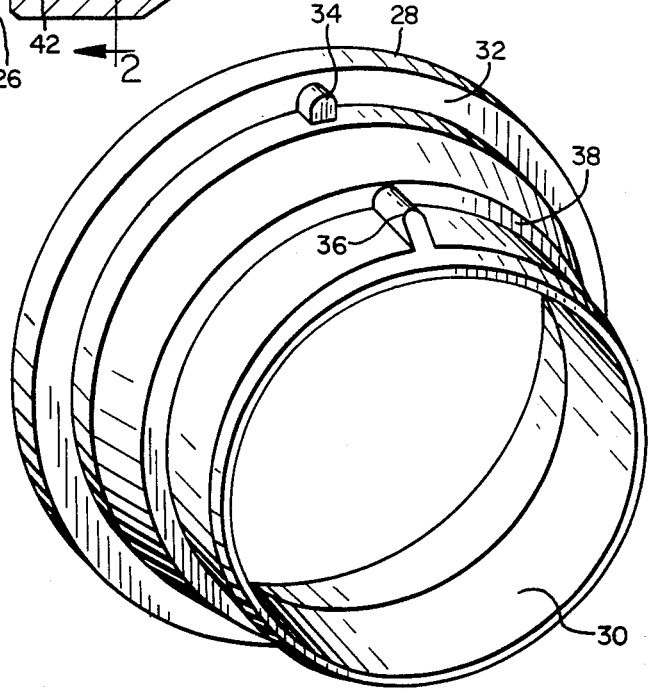
FIG. 4 is a perspective view of the collar member.

Thereafter the top of the collar member 28 is inserted axially into the central aperture 22a of the core 22 with a key 36 on the exterior of the collar member aligned angularly with a mating keyway formed in the periphery of the core aperture 22a. Fastening of the member 28 to the core 22 can likewise be by means of a close-tolerance fit, suitable adhesive, or ultrasonic heat staking. The extent to which the collar member can be inserted axially into the aperture 22a is limited by the abutment of an exterior annular shoulder 38 of the collar member with the periphery of the core aperture 22a, the shoulder 38 being located a predetermined axial distance from the flange 32 of the collar member so as to orient the core 22 a predetermined spaced axial distance from the circuit board 26. Thus the key 36 and shoulder 38 of the collar member 28, because of their angular and axial orientation with respect to the circuit board 26 by means of the key 34 and flange 32 of the collar member, serve to orient the core 22 and winding 24 both angularly and axially with respect to the circuit board 26. Accordingly, the winding leads, such as 40 in FIG. 2, are thereby both angularly and axially aligned with mating apertures in the circuit board 26 to facilitate subsequent soldering. Moreover the core 22 and winding 24 are also thereby properly angularly aligned with the Hall effect sensors 42, to be discussed below, which are mounted on the circuit board 26.

With the components of the stator assembly thus rigidly interconnected in proper angular and axial orientation by the collar member 28, the stator assembly can be easily engaged from above by inserting an expandable plug or similar mechanical device into the top of the passageway 30 of the collar member and engaging the inner wall of the collar member either by friction or by mechanical engagement with an inner annular shoulder 44 to be discussed below. By such engagement, the stator assembly can be suspended with the circuit board 26 at the bottom and the leads 40 of the coil protruding downwardly through the bottom of the circuit board. Such leads 40 as well as the Hall effect sensor leads 42a) can then be soldered to the circuit board by any known high-production method such as wave soldering.

After the manufacture of the stator assembly has been completed, the hub 10a of the rotor mount 10 is inserted axially into the internal passageway 30 of the collar member 28 at the base thereof, the extent of such insertion being limited by the mating abutment of the internal annular shoulder 44 of the collar member with an external shoulder 46 (FIG. 1) on the hub 10a, after which the rotor 18 is mounted rotatably on the rotor mount 10 in surrounding relationship to the stator assembly. Connection of the collar member 28 to the inserted hub 10a can be by means of a close-tolerance fit, adhesive, or ultrasonic heat staking. The hub 10a of the rotor mount 10 determines the axial position of the rotor 18 by the end abutment of one of the bearings 12 therewith, the bearings 12 being positioned in the hub 10a in predetermined axial relation to the shoulder 46. Since the hub 10a is definitely positioned axially with respect to the collar member 28 by the abutment of the shoulders 44 and 46, respectively, and the collar member 28 is definitely positioned axially with respect to the circuit board 26 and core 22, it will be seen that a precise axial orientation of the core 22 and circuit board 26 with respect to the rotor 18 is thereby automatically obtained. This is important because the axial proximity of the Hall effect sensors 42 with respect to the permanent magnets 20 of the rotor is critical to the proper operation of the sensors. Also, proper axial alignment of the permanent magnets 20 with respect to the core 22 is important to optimize performance of the motor.

It should also be noted that, although the periphery of the circuit board 26 also engages the rotor mount 10 as shown in FIG. 1, so that such engagement could theoretically be relied on alternatively to axially orient the rotor 18 with respect to the stator assembly, such point of engagement is so far removed radially from the axis of rotation 15 that reliance thereon for axial orientation would probably introduce errors in axial alignment due to flexure of the circuit board 26. However the engagement of the periphery of the circuit board 26 with the rotor mount 10 is significant from an angular point of view because the periphery of the circuit board contains a keyway 26b (FIG. 2) which mates with a mating key (not shown) in the rotor mount 10 to insure that the circuit board leads 48 exit the rotor mount 10 at the proper angular location.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. In an electrical machine having a generally annular core of magnetically-permeable material with an aperture extending centrally therethrough, an electrically-conductive winding mounted on said core, a rotor having permanent magnets mounted thereon positioned in surrounding relationship to said core and being mounted for rotation with respect to said core about an axis, and a current transmission circuit board extending transversely to said axis and being spaced axially from said core for supplying electrical current to said winding and for mounting Hall effect sensors for sensing the magnetic fields of said permanent magnets as said permanent magnets rotate, the improvement which comprises a member matingly insertable axially through said aperture in said core while said winding is mounted thereon for connecting said core and circuit board to each other, said magneticaly-permeable material of said core having first angular orientation means formed therein and said member having second angular orientation means matingly connectable with said first angular orientation means upon axial insertion of said member through said aperture while said winding is mounted on said core for positioning said circuit board with respect to said core in a predetermined angular relationship about said axis, said member further having first axial orientation means matingly connectable with said core while said winding is mounted thereon for positioning said circuit board at a predetermined spaced axial distance from said core.

2. The apparatus of claim 1 wherein said member has means defining a passageway extending axially therethrough.

3. The apparatus of claim 1 wherein said first axial orientation means comprises limiting means formed on said member for matingly abutting the periphery of said aperture of said core and thereby limiting the extent to which said member can be inserted axially through said aperture.

4. The apparatus of claim 3 wherein said first axial orientation means further comprises means formed on said member at a position located a predetermined axial distance from said limiting means for matingly interconnecting said circuit board with said member at said position.

5. The apparatus of claim 1 wherein said member further includes second axial orientation means for matingly interconnecting with said rotor and thereby positioning said core and said circuit board in a predetermined axial relationship with respect to said rotor.

6. The apparatus of claim 5 wherein said member has means defining a passageway extending axially therethrough, and wherein said apparatus has rotor mounting means inserted axially through said passageway for rotatably mounting said rotor, said second axial orientation means comprising limiting means formed in said passageway for matingly abutting said rotor mounting means and thereby limiting the extent to which said rotor mounting means can be inserted axially through said passageway.

7. The apparatus of claim 1, said member and said circuit board respectively including matingly connectable third and fourth angular orientation means for positioning said circuit board with respect to said core in a predetermined angular relationship about said axis.

8. The apparatus of claim 4 wherein said position is proximate one axial extremity of said member.

9. In an electrical machine having a core of magnetically-permeable material with an electrically-conductive winding mounted thereon, a rotor having permanent magnets mounted thereon positioned in surrounding relationship to said core and being mounted for rotation with respect to said core about an axis by a bearing, and a current transmission circuit board, the improvement comprising generally annular collar means for supportably mounting said core and said circuit board with respect to each other, said collar means having means defining a passageway extending axially therethrough, and including first orientation means for spacing said circuit board and said core a predetermined axial distance apart and second orientation means for positioning said core in a predetermined angular relationship about said axis with respect to said circuit board, said winding being mounted on said core independently of said collar means, and housing means, separate from said collar means, axially insertable within said passageway of said collar means and interposed between said collar means and said bearing for mounting said bearing, said collar means including third orientation means for axially positioning said collar means with respect to said housing and said bearing.

10. The apparatus of claim 9, said circuit board having a plurality of electronic components mounted thereon and a plurality of connective means for achieving electrical connections with said electronic components and with said winding, said circuit board having first and second sides respectively with said connective means on said first side and all of said electronic components on said second side, said core and said circuit board being mounted on said collar means so that said first side of said circuit board faces away from said core and said second side faces toward said core.

11. The apparatus of claim 9, wherein said winding includes an electrical lead and said lead extends through said circuit board from said second side to said connective means on said first side.

12. A subassembly of an electrical machine of the type having a rotor with permanent magnets mounted thereon positioned in surrounding relationship to a core-mounted electrically conductive winding and being mounted for rotation with respect to said winding about an axis by a bearing, said subassembly comprising:
    (a) a magnetically-permeable core having said electrically-conductive winding mounted thereon and including a first electrical lead from said winding;
    (b) a current transmission circuit board having a plurality of electronic components mounted thereon having respective second electrical leads therefrom, and a plurality of connective means for achieving electrical connections with said electronic components and with said winding, said circuit board having first and second sides respectively with said connective means on said first side and all of said electronic components on said second side;
    (c) generally annular collar means supportably mounting said circuit board and said core with respect to each other, said collar means including means orienting said circuit board a predetermined axial distance from said core and in a predetermined angular relationship about said axis with respect to said core, said first side of said circuit board facing away from said core and said second side of said circuit board facing toward said core, and said first electrical lead from said winding and said second electrical leads from said electronic components extending through said circuit board from said second side to said connective means on said first side.

13. The subassembly of claim 12, said collar means having means defining a passageway extending axially therethrough for receiving a separate bearing assembly including a bearing housing, said collar means including means cooperating with said bearing housing for axially positioning said bearing housing with respect to said collar means.

* * * * *

UNITED STATES PATENT AND TRADEMARK OFFICE
CERTIFICATE OF CORRECTION

PATENT NO. : 4,540,906

DATED : September 10, 1985

INVENTOR(S) : Hans A. Blom

It is certified that error appears in the above-identified patent and that said Letters Patent is hereby corrected as shown below:

Col. 4,   line 42   Before "as" insert --(--.

Signed and Sealed this

Tenth Day of December 1985

[SEAL]

Attest:

Attesting Officer

DONALD J. QUIGG

Commissioner of Patents and Trademarks